Patented Aug. 23, 1932

1,873,727

UNITED STATES PATENT OFFICE

HEINRICH SPECKETER, OF FRANKFORT-ON-THE-MAIN-GRIESHEIM, AND JULIUS SÖLL, OF FRANKFORT-ON-THE-MAIN-SCHWANHEIM, GERMANY, ASSIGNORS TO I. G. FARBENINDUSTRIE AKTIENGESELLSCHAFT, OF FRANKFORT-ON-THE-MAIN, GERMANY

DOUBLE ALUMINUM ALKALI FLUORIDE COMPOUNDS

No Drawing. Application filed March 13, 1930, Serial No. 435,658, and in Germany March 20, 1928.

The present invention relates to double aluminum alkali fluoride compounds and is more especially concerned with improvements in a method of producing same.

An object of the present invention is to obtain, in the course of the process, precipitates which are easily separable from the mother liquors and in which the washing of the precipitates is effected in a shorter time and more efficiently than was hitherto feasible. The process according to the invention is particularly useful when working up aluminate lyes containing, in consequence of the particular method of production applied, also other constituents such as chromates etc.

When working up mixtures of aluminate lyes and fluoric acid so as to obtain double compounds of the cryolite and chiolite type, the precipitates obtained were hitherto difficult to separate from the mother liquor and for the same reason also difficult to wash out.

According to the present invention the aluminate lye on being run into the precipitating vessel is slightly acidulated before the aluminate contained therein is allowed to react with the fluoric acid for the purpose of causing precipitation of double compounds. This can be effected by simultaneously running aluminate lye and fluoric acid into part of the slightly acid reaction mixture of a previous operation, thereby constantly maintaining a slightly acid reaction also in the actual reaction mixture. In this case the aluminate lye and the fluoric acid should be gradually added in a ratio corresponding to the composition of the double compound to be recovered. Instead of utilizing part of the reaction mixture of a previous operation, the acid filtrate of a previous operation, or the slightly acidulated water recovered in the course of washing out the double compound precipitate or finally also any other water containing, say, 1 percent of soluble acid, may be applied. The nature of the acid employed for causing the acid reaction is more or less irrelevant; we preferably, however, employ chromic acid or fluoric acid. In the latter case, a slight excess of fluoric acid over the quantity required by the stoichiometric ratio is run into the precipitating vessel along with the aluminate lye so as to maintained, in the filtrate of the reaction mixture, a fluoric acid content of about 1 percent. The acid reaction may further be also produced by employing a suitable salt such as a soluble chromate in the reaction mixture which is decomposed by the precipitative reaction with a liberation of free acid. The slightly acid reaction of the bichromate or chromic acid thus produced in the aluminate lye already suffices for producing easily filtrable precipitates and an extra addition of acid may in this case generally be dispensed with.

When the fluoric acid employed contains silicic acid it is advantageous to remove the latter before precipitation of the double compound from lyes containing a chromate by adding a solution of a mono-or bichromate containing a sufficient amount of alkali. In this manner the silicic acid is separated as an insoluble alkali silico fluoride which is removed. The chromic acid contents of the fluoric acid obtained in the filtrate do not detrimentally affect the precipitation of the aluminum alkali double compound.

Example 1

0.5 litres of a 1 percent aqueous solution of fluoric acid are heated to 60° C. and simultaneously 1 litre of an aluminate lye consisting of 102 grams $Al_2O_3$ and 124 grams $Na_2O$, and 780 grams of an aqueous fluoric acid solution (26 percent HF) are added while stirring in such a manner that both solutions neutralize each other. The chiolite obtained is easily filtrable whereas this is not the case when the aluminate lye as such is dripped into the concentrated fluoric acid or vice versa.

Example 2

1 litre of an aqueous solution containing 102 grams $Al_2O_3$, 140 grams $Na_2CrO_4$ and 120 grams $Na_2O$, and 800 grams of an aqueous fluoric acid solution (30 percent HF) are added in drops while stirring to 500 cc. of slightly acidulated water or to an equal amount of the filtrate from a previous operation, at such a rate that the addition is completed after about 5 minutes. The precipitated chiolite is filtered off and washed out until all chromate is removed. The washing out process is completed within short time as the precipitate is obtained in an easily filtrable condition. Any remaining traces of chromates may be eliminated by washing out the residue with diluted acid. The acid contents of the filtrate may be utilized for recovering the bichromate in the manner known per se, viz. by adding a quantity of monochromate and separating any impurities present.

A further improvement in the filtrability of the cryolite precipitate is obtained by employing aluminate lyes containing a smaller percentage of $Na_2O$ than indicated in the foregoing examples, or by neutralizing part of the $Na_2O$ contained in the lye during precipitation by means of a small quantity of 50 percent sulphuric acid.

We claim:

1. In a process of producing double compounds of aluminum alkali fluorides of the cryolite and chiolite type, the improvement which consists in gradually, simultaneously, and separately adding to water slightly acidulated with a water-soluble inorganic acid a solution containing an aluminate and a fluoric acid solution, the amounts of the aluminate and the fluoric acid added approximately corresponding to the stoichiometric ratio of aluminum and fluoride prevailing in the product to be obtained.

2. In a process of producing double compounds of aluminum alkali fluorides of the cryolite and chiolite type, the improvement which consists in gradually, simultaneously, and separately adding to moderately heated water slightly acidulated with a water-soluble inorganic acid a solution containing an aluminate and a fluoric acid solution, the amounts of the aluminate and the fluoric acid added approximately corresponding to the stoichiometric ratio of aluminum and fluoride prevailing in the product to be obtained.

3. In a process of producing double compounds of aluminum alkali fluorides of the cryolite and chiolite type, the improvement which consists in gradually, simultaneously, and separately adding to a moderately heated slightly acid aqueous solution of fluoric acid a solution containing an aluminate and a fluoric acid solution, the amounts of the aluminate and the fluoric acid added approximately corresponding to the stoichiometric ratio of aluminum fluoride prevailing in the product to be obtained.

4. In a process of producing double compounds of aluminum alkali fluorides of the cryolite and chiolite type, the improvement which consists in gradually, simultaneously, and separately adding to a moderately heated aqueous solution of about 1 percent of fluoric acid a solution containing an aluminate and a fluoric acid solution, the amounts of the aluminate and the fluoric acid added approximately corresponding to the stoichiometric ratio of aluminum and fluoride prevailing in the product to be obtained.

5. In a process of producing double compounds of aluminum alkali fluorides of the cryolite and chiolite type, the improvement which consists in gradually, simultaneously, and separately adding to a slightly acid aqueous solution of a water-soluble, inorganic acid a solution containing an aluminate and a chromate, and a fluoric acid solution, the amounts of the aluminate and the fluoric acid added approximately corresponding to the stoichiometric ratio of aluminum and fluoride prevailing in the product to be obtained.

In testimony whereof, we affix our signatures.

HEINRICH SPECKETER.
JULIUS SÖLL.